(12) United States Patent
Shin et al.

(10) Patent No.: US 11,478,697 B2
(45) Date of Patent: Oct. 25, 2022

(54) TERMINAL CONNECTED TO ACTION ROBOT AND OPERATING METHOD THEREOF

(71) Applicant: LG ELECTRONICS INC., Seoul (KR)

(72) Inventors: Yongkyoung Shin, Seoul (KR); Sanghun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 459 days.

(21) Appl. No.: 16/774,533

(22) Filed: Jan. 28, 2020

(65) Prior Publication Data

US 2021/0023440 A1 Jan. 28, 2021

(30) Foreign Application Priority Data

Jul. 23, 2019 (KR) .................. 10-2019-0088683

(51) Int. Cl.
*B25J 3/00* (2006.01)
*B25J 9/00* (2006.01)
*A63F 13/235* (2014.01)

(52) U.S. Cl.
CPC .............. *A63F 13/235* (2014.09); *B25J 3/00* (2013.01); *B25J 9/0003* (2013.01); *Y10S 901/50* (2013.01)

(58) Field of Classification Search
CPC ........... B25J 3/00; B25J 9/0003; Y10S 901/50
See application file for complete search history.

(56) References Cited

U.S. PATENT DOCUMENTS

| 9,637,310 | B1* | 5/2017 | Zou | G05D 1/0297 |
|---|---|---|---|---|
| 11,167,414 | B2* | 11/2021 | Yokoyama | B25J 9/1694 |
| 2017/0269607 | A1* | 9/2017 | Fulop | B25J 13/025 |
| 2017/0334066 | A1* | 11/2017 | Levine | B25J 9/1656 |
| 2017/0361468 | A1* | 12/2017 | Cheuvront | G06F 3/01 |
| 2019/0391597 | A1* | 12/2019 | Dupuis | G05D 1/0289 |

* cited by examiner

*Primary Examiner* — Kira Nguyen
(74) *Attorney, Agent, or Firm* — Birch, Stewart, Kolasch & Birch, LLP

(57) ABSTRACT

Disclosed herein is a terminal including a communication transceiver configured to establish connection with a first action robot, an input interface configured to receive an execution request of a cluster control mode of an application, and a processor configured to search for at least one other action robot other than the first action robot through the communication transceiver in response to the received execution request, control the communication transceiver to attempt connection with the searched at least one other action robot, and control output of action robot content through the first action robot and the at least one other action robot according to execution of the cluster control mode, when connection with the at least one other action robot is established.

16 Claims, 13 Drawing Sheets

TERMINAL CONNECTED TO ACTION ROBOT AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2019-0088683 (filed on Jul. 23, 2019), which is hereby incorporated by reference in its entirety.

BACKGROUND

The present disclosure relates to a terminal connected to an action robot and, more particularly, to a terminal for providing a cluster control mode for controlling driving of a plurality of action robots and a method of operating the same.

As robot technology has been developed, methods of constructing a robot by modularizing joints or wheels have been used. For example, a plurality of actuator modules configuring the robot is electrically and mechanically connected and assembled, thereby manufacturing various types of robots such as dogs, dinosaurs, humans, spiders, etc.

A robot which may be manufactured by assembling the plurality of actuator modules is generally referred to as a modular robot. Each actuator module configuring the modular robot has a motor provided therein, such that motion of the robot is executed according to rotation of the motor. Motion of the robot includes action of a robot such as movement and dance.

Recently, as entertainment robots come to the front, interest in robots for inducing human interest or entertainment has been increasing. For example, technology for dancing to music or making motions or facial expressions to stores (fairy tales) has been developed.

By presetting a plurality of motions suiting music or fairy tales and performing predetermined motion to music or a fairy tale played back by an external apparatus, the action robot performs motion.

An application for controlling driving of the robot may be installed and executed in a terminal such as a smartphone or a tablet. A user may control motion of the robot communicating with the terminal through the application.

Meanwhile, such a robot may have various shapes and the user may want to control cluster motion (or group motion) using robots having various shapes. For example, when robots having an idol group shape are provided, the user may output the choreography of the idol group through the robots.

SUMMARY

An object of the present disclosure is to provide a terminal and method capable of controlling a plurality of action robots to output group motion.

Another object of the present disclosure is to provide a terminal capable of improving quality of action robot content output through a plurality of action robots.

According to an embodiment, a terminal includes a communication transceiver configured to establish connection with a first action robot, an input interface configured to receive an execution request of a cluster control mode of an application, and a processor configured to search for at least one other action robot other than the first action robot through the communication transceiver in response to the received execution request, control the communication transceiver to attempt connection with the searched at least one other action robot, and control output of action robot content through the first action robot and the at least one other action robot according to execution of the cluster control mode, when connection with the at least one other action robot is established.

The processor may receive an output request of the action robot content through the input interface, and transmit content data of multimedia content included in the action robot content and motion data included in the action robot content to the first action robot and the at least one other action robot, in response to the received output request.

In some embodiments, the action robot content may include a plurality of motion data, and the processor may transmit first motion data to some of the action robots and transmit second motion data different from the first motion data to the other action robots.

In some embodiments, the processor may set any one of the action robots as a master and set the remaining at least one action robot as a slave, and transmit the content data to the action robot set as the master.

In some embodiments, when the first action robot is connected and registered with the terminal in advance and the at least one other action robot is connected and registered with another terminal in advance, the processor may set the first action robot among the action robots as the master.

In some embodiments, the processor may display a screen for setting placement positions of the plurality of connected action robots through a display, the screen may include a plurality of placement position markers corresponding to a plurality of placement positions, and a first placement position of the plurality of placement positions may correspond to the master.

In some embodiments, the number of placement position markers may correspond to the number of action robots connected to the terminal, and a display position of each of the plurality of placement position markers may be changed based on input received through the input interface.

In some embodiments, the processor may display a screen corresponding to an image acquired through a camera on the display, overlap and display a plurality of guide items corresponding to the plurality of placement position markers on the screen, and recognize the plurality of action robots located at positions respectively corresponding to the plurality of guide items.

In some embodiments, the processor may set, as the master, an action robot located at a position of a guide item corresponding to the first placement position marker among the plurality of action robots.

In some embodiments, the processor may receive the content data and the motion data from a management device connected through the communication transceiver in response to the output request.

In some embodiments, the terminal may further include a memory configured to store the content data and the motion data included in the action robot content, and the processor may transmit the content data and the motion data stored in the memory to the first action robot and the at least one other action robot.

In some embodiments, the processor may acquire an image including the action robots using a camera while the action robot content is output, detect error of a motion output time point of at least one of the action robots based on the acquired image, and adjust the motion output time point of the at least one action robot based on the detected error.

According to another embodiment, a method of operating a terminal includes establishing connection with a first action robot, receiving an execution request of a cluster control mode, searching for at least one other action robot other than the first action robot in response to the received execution request, attempting connection with the searched at least one other action robot, and controlling output of action robot content through the first action robot and the at least one other action robot, when connection with the at least one other action robot is established, and the action robot content includes content data of multimedia content and motion data.

DETAILED DESCRIPTION OF THE EMBODIMENTS

Figure 1:
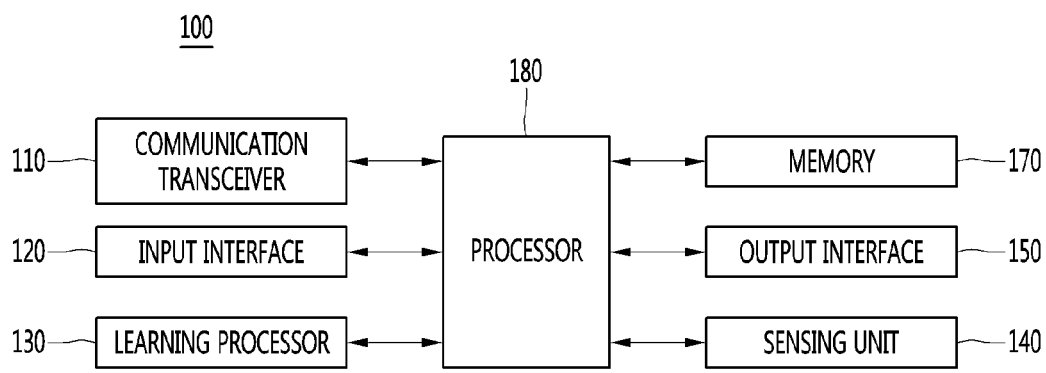
FIG. 1 illustrates an AI device including a robot according to an embodiment of the present disclosure.

Description will now be given in detail according to exemplary embodiments disclosed herein, with reference to the accompanying drawings. The accompanying drawings are used to help easily understand the embodiments disclosed in this specification and it should be understood that the embodiments presented herein are not limited by the accompanying drawings. As such, the present disclosure should be construed to extend to any alterations, equivalents and substitutes in addition to those which are particularly set out in the accompanying drawings.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the terminal 100 may include a communication transceiver 110, an input interface 120, a learning processor 130, a sensing unit 140, an output interface 150, a memory 170, and a processor 180.

The communication transceiver 110 may transmit and receive data to and from external devices such as other AI devices 100a to 100e and the AI server 200 by using wire/wireless communication technology. For example, the communication transceiver 110 may transmit and receive sensor information, a user input, a learning model, and a control signal to and from external devices.

The communication technology used by the communication transceiver 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
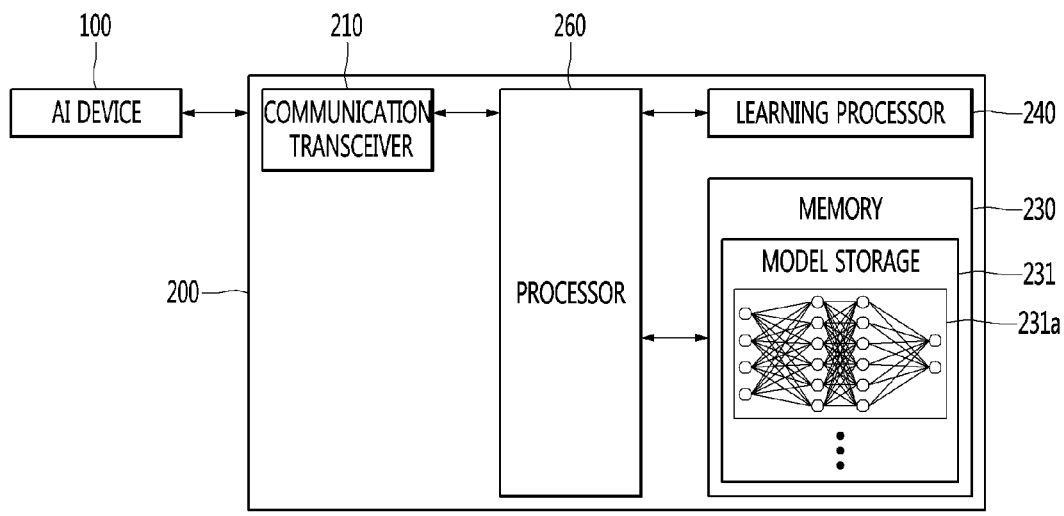
FIG. 2 illustrates an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication transceiver 210, a memory 230, a learning processor 240, a processor 260, and the like.

The communication transceiver 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
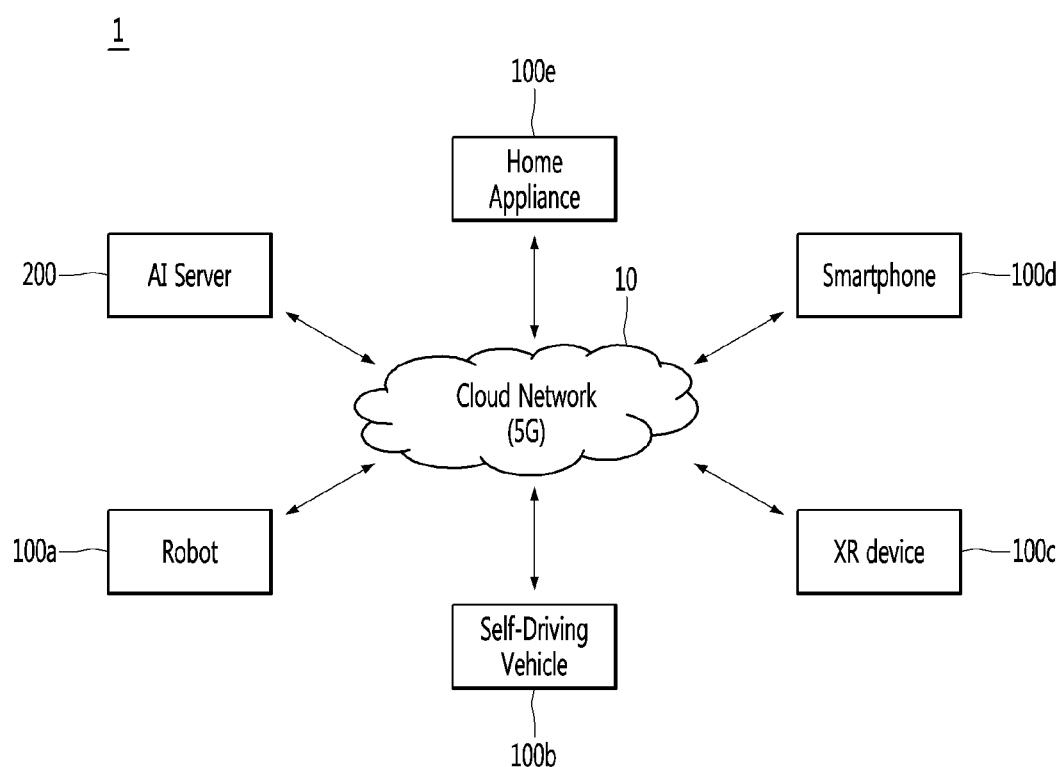
FIG. 3 illustrates an AI system including a robot according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
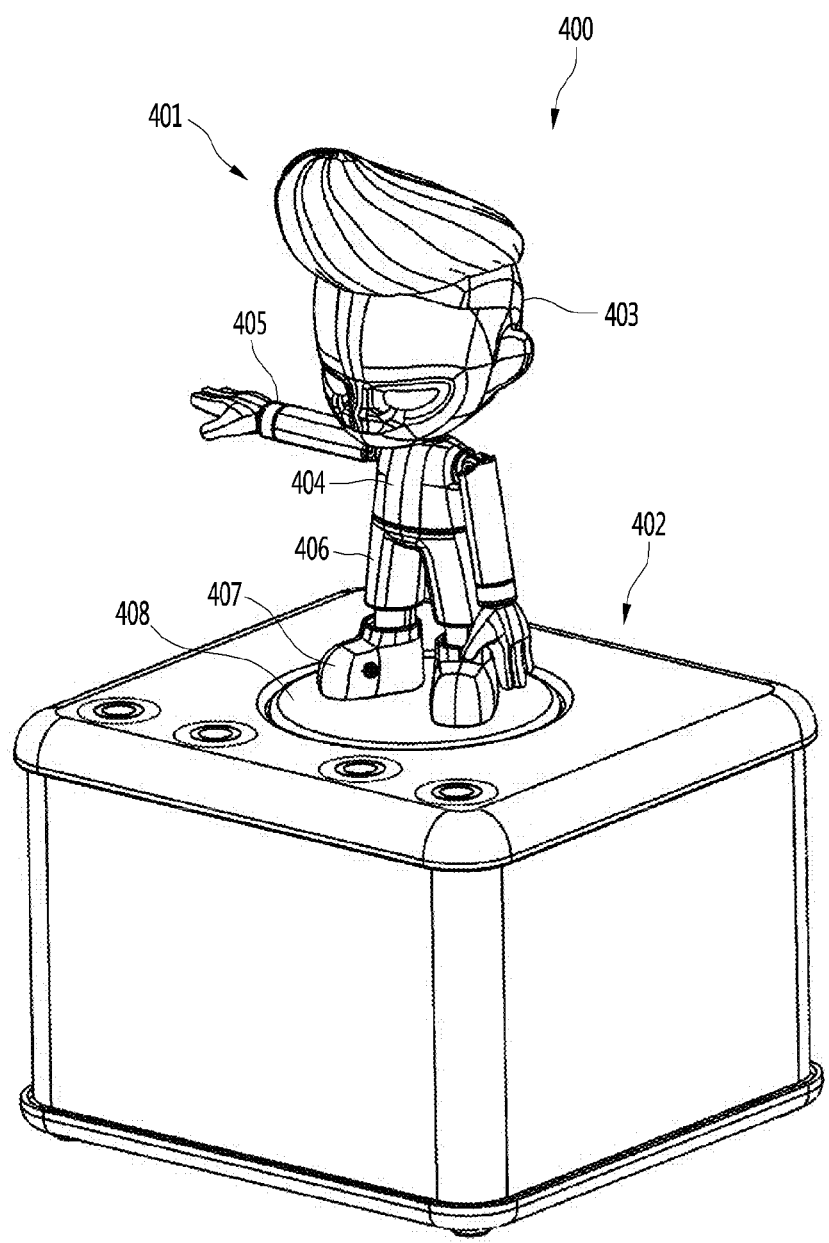
FIG. 4 is a perspective view of an action robot according to an embodiment of the present disclosure.

FIG. 4 is a perspective view of an action robot according to an embodiment of the present disclosure.

Referring to FIG. 4, the action robot 400 may include a robot module 401 and a base 402 supporting the robot module 401 from below.

The robot module 401 may have a shape approximately similar to that of a human body.

The robot module 401 may include a head 403, bodies 404 and 406, and arms 405. The robot module 401 may further include feet 407 and a sub base 408.

The head 403 may have a shape corresponding to a human head. The head 403 may be connected to the upper portion of the body 404.

The bodies 404 and 406 may have a shape corresponding to a human body. The bodies 404 and 406 may be fixed and may not move. Spaces in which various parts may be received may be formed in the bodies 404 and 406.

The body may include a first body 404 and a second body 406.

The internal space of the first body 404 and the internal space of the second body 406 may communicate with each other.

The first body 404 may have a shape corresponding to a human upper body. The first body 404 may be referred to as an upper body. The first body 404 may be connected with the arms 405.

The second body 406 may have a shape corresponding to a human lower body. The second body 406 may be referred to as a lower body. The second body 406 may include a pair of legs.

The first body 404 and the second body 406 may be detachably fastened to each other. Therefore, it is possible to conveniently assemble the bodies and to easily repair parts disposed in the bodies.

The arms 405 may be connected to both sides of the body.

More specifically, the pair of arms 405 may be connected to the shoulders located at both sides of the first body 404. The shoulders may be included in the first body 404. The shoulders may be located at the upper portions of both sides of the first body 404.

The arms 405 may be rotated relative to the first body 404, and, more particularly, the shoulders. Accordingly, the arms 405 may be referred to as a movable part.

The pair of arms 405 may include a right arm and a left arm. The right arm and the left arm may independently move.

The feet 407 may be connected to the lower portion of the second body 406, that is, the lower ends of legs. The feet 407 may be supported by the sub base 408.

The sub base 408 may be fastened to at least one of the second body 406 or the feet 407. The sub base 408 may be seated in and coupled to the base 402 at the upper side of the base 402.

The sub base 408 may have a substantially disc shape. The sub base 408 may rotate relative to the base 402. Accordingly, the entire robot module 401 may rotate relative to the sub base 408.

The base 402 may support the robot module 401 from below. More specifically, the base 402 may support the sub base 408 of the robot module 401 from below. The sub base 408 may be detachably coupled to the base 402.

A processor 480 (see FIG. 6) for controlling overall operation of an action robot 1, a battery (not shown) for storing power necessary for operation of the action robot 1, and a robot module driver 460 (see FIG. 6) for operating the robot module 401 may be mounted on the base 402. In addition, a speaker 452 (see FIG. 6) for outputting sound may be disposed in the base 402. In some embodiments, an input interface 420 (see FIG. 6) such as a button or a display 454 (see FIG. 6) for outputting various types of information in a visual form may be disposed on one surface of the base 402.

Figure 5:
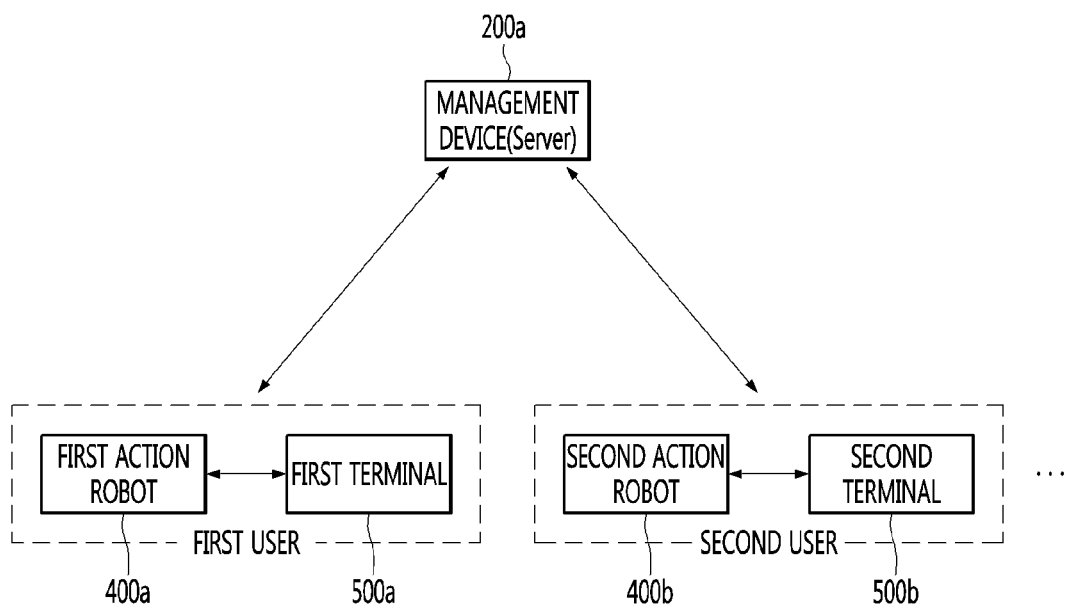
FIG. 5 is a view showing the configuration of an action robot system including the action robot shown in FIG. 4.

FIG. 5 is a view showing the configuration of an action robot system including the action robot shown in FIG. 4.

Referring to FIG. 5, the action robot system may include a management device 200a, action robots 400a and 400b of a plurality of users, and terminals 500a and 500b.

The management device 200a may perform overall management of the action robot system. For example, the management device 200a may correspond to a server and may be implemented as a computing device such as a PC, a workstation, etc.

The management device 200a may include a database for storing and managing a plurality of action robot content. For example, the action robot content may include multimedia content and motion (action) content.

The multimedia content may include content in the sound and/or graphic form output through the output interface 450 (see FIG. 6) of the action robot 400. For example, the multimedia content may include content of music, fairy tale or education.

The motion content may include motion data for control of the robot module driver 460 of the action robot 400. The action robot 400 may control the robot module driver 460 based on the motion data, thereby providing the motion content through the robot module 401.

Although the management device 200a may transmit data related to the action robot content to the action robot 400 through the terminals 500a and 500b (collectively denoted by 500), the data related to the action robot content may be directly transmitted to the action robot 400 in some embodiments.

In addition, the management device 200a may perform management of users who use a service related to the action robot. For example, the management device 200a may include a database for storing and managing information on the users (an account, a password, terminal identification information, action robot identification information, etc.). Therefore, the management device 200a may provide the action robot content only using the action robot 400 or the terminal 500 of the registered user.

In some embodiments, the management device 200a may be included in the AI server 200 described with reference to FIG. 2. That is, the description related to the AI server 200 described above with reference to FIGS. 2 to 3 is similarly applicable to the management device 200a.

The action robots 400a and 400b may provide predetermined motion (choreography, gesture, etc.) through the robot module 401. In addition, the action robots 400a and 400b may drive the robot module 401 to provide motion related to the multimedia content while outputting the multimedia content (e.g., music, fairy tale, educational content, etc.) through the output interface 450 (see FIG. 6). The action robots 400a and 400b may more vividly provide the multimedia content to the user.

Meanwhile, the user of the action robots 400a and 400b may control operation of the action robots 400a and 400b through the terminals 500a and 500b or register the identification information of the action robots 400a and 400b in the database of the management device 200a in a state of matching the account of the user.

For example, the terminals 500a and 500b may be connected to the management device 200a through an application related to the service, and control operation of the action robots 400a and 400b through the management device 200a. In some embodiments, the terminals 500a and 500b may be directly connected to the action robots 400a and 400b through a short range wireless communication method to connect operation of the action robots 400a and 400b.

The terminal 500 may mean a mobile terminal such as a smartphone, a tablet PC, etc. and, in some embodiments, may include a fixed terminal such as a desktop PC.

Meanwhile, the terminal 500 may correspond to an example of the AI device 100 shown in FIG. 1. That is, the terminal 500 may include at least some of the components included in the AI device 100 shown in FIG. 1. In addition, the description of FIG. 1 is similarly applicable to the terminal 500.

Meanwhile, each of the action robots 400a and 400b may be controlled only through the terminals 500a and 500b connected and registered by the user. However, in some cases, a user (a first user) may control not only the action robot 400a thereof but also the action robot 400b of another person (a second user), thereby using action robot content having group motion (or cluster motion). For example, the robot module 401 of the action robot 400 may be implemented as a character indicating the member of an idol group. The robot module of the first action robot 400a may be the character of a first member and the robot module of the second action robot 400b may be the character of a second member. In this case, the first user may want to output action robot content having the group choreography of the idol group through the first action robot 400a and the second action robot 400b.

In this case, the second action robot 400b needs to be controlled by the first terminal 500a while the action robot content having the group motion is output.

According to the embodiment of the present disclosure, the terminal 500a or 500b may provide a cluster control mode for controlling the plurality of action robots 400a and 400b. Embodiments related thereto will be described in detail below with reference to FIGS. 7 to 15.

Figure 6:
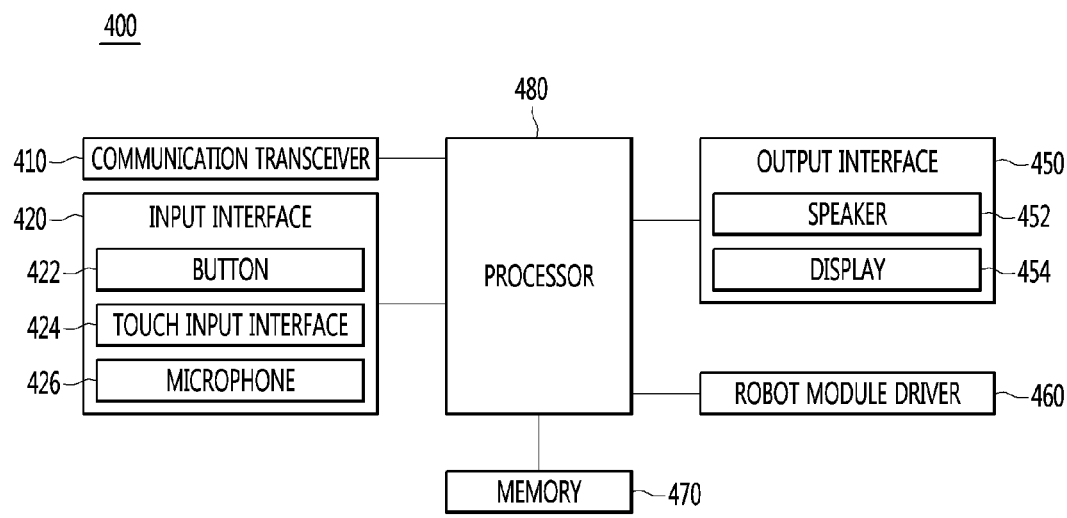
FIG. 6 is a block diagram showing the control configuration of an action robot according to an embodiment of the present disclosure.

FIG. 6 is a block diagram showing the control configuration of an action robot according to an embodiment of the present disclosure.

Referring to FIG. 6, the action robot 400 may include a communication transceiver 410, an input interface 420, an output interface 450, a robot module driver 460, a memory 470 and a processor 480. The components shown in FIG. 6 are examples for convenience of description and the action robot 400 may include more or fewer components than those shown in FIG. 6.

The components shown in FIG. 6 may be provided in the base 402 of the action robot 400. That is, the base 402 may configure the body of the action robot 400, and the robot module 401 may be detached from the base 402, such that the action robot 400 is implemented as a modular robot.

Meanwhile, the description related to the AI device 100 of FIGS. 1 to 2 is similarly applicable to the action robot 400 of the present disclosure. That is, the communication transceiver 410, the input interface 420, the output interface 450, the memory 470, and the processor 480 may correspond to the communication transceiver 110, the input interface 120, the output interface 150, the memory 170 and the processor 180 shown in FIG. 1, respectively.

The communication transceiver 410 may include communication modules for connecting the action robot 400 to the management device 200a or the terminal 500 over a network. The communication modules may support any one of the communication technologies described above with reference to FIG. 1.

For example, the action robot 400 may be connected to the network through an access point such as a router. Therefore, the action robot 400 may receive various types of information, data or content from the management device 200a or the terminal 500 over the network.

The input interface 420 may include at least one input part for acquiring input or commands related to operation of the action robot 400 or acquiring various types of data. For example, the at least one input part may include a physical input part such as a button 422 or a dial, a touch input interface 424 such as a touchpad or a touch panel, a microphone 426 for receiving user's speech, etc.

Meanwhile, the processor 480 may transmit the speech data of a user received through the microphone 426 to a server through the communication transceiver 410. The server may analyze the speech data to recognize a wakeup word, a command word, a request, etc. in the speech data, and provide a result of recognition to the action robot 400.

The server may be the management device 200a of FIG. 5 or a separate speech recognition server. In some embodiments, the server may be implemented as the AI server 200 described above with reference to FIG. 2. In this case, the server may recognize a wakeup word, a command word, a request, etc. in the speech data via a model (artificial intelligence network 231a) trained through the learning processor 240. The processor 480 may process the command word or request included in the speech based on the result of recognition.

In some embodiments, the processor 480 may directly recognize the wakeup word, the command word, the request, etc. in the speech data via a model trained by the learning processor in the action robot 400. That is, the learning processor may train a model composed of an artificial neural network using the speech data received through the microphone 426 as training data.

Alternatively, the processor 480 may receive data corresponding to the trained model from server, store the data in the memory 470, and recognize the wakeup word, the command word, the request, etc. in the speech data through the stored data.

The output interface 450 may output various types of information or messages related to operation or state of the action robot 400 or various services, programs, applications, etc. executed in the action robot 400 or various types of multimedia content (e.g., music, fairy tale, educational content, etc.). For example, the output interface 450 may include a speaker 452 and a display 454.

The speaker 452 may output the various types of information or messages, or content in the form of speech or sound.

The display 454 may output the various types of information or messages in a graphic form. In some embodiments, the display 454 may be implemented in the form of a touchscreen along with a touch input interface 424. In this case, the display 454 may perform not only an output function but also an input function.

The robot module driver 460 may operate the robot module 401 mounted on the base 402 to provide motion (action) through the robot module 401.

For example, the robot module driver 460 may include a servo motor or a plurality of motors. In another example, the robot module driver 460 may include an actuator.

The processor 480 may receive motion data for control of the robot module driver 460 through the management device 200a or the terminal 500. The processor 480 may control the robot module driver 460 based on the received motion data, thereby providing the motion (or action) of the robot module 401 corresponding to the motion data.

Various types of data such as control data for controlling operation of the components included in the action robot 400, data for performing operation based on the command or request acquired through the communication transceiver 410 or input acquired through the input interface 420, etc. may be stored in the memory 470.

In addition, program data of software modules or applications executed by at least one processor or controller included in the processor 480 may be stored in the memory 470.

In addition, at least one multimedia content and at least one motion data provided by the management device 200a or the terminal 500 may be stored in the memory 470. In some embodiments, mapping information of motion data mapped to multimedia content may be further stored in the memory 470. In this case, the processor 480 may load the motion data mapped to the multimedia content based on the mapping information, when an output request of predetermined multimedia content is received. The processor 480 may provide motion corresponding to the motion data, by controlling the robot module driver 460 based on the loaded motion data. That is, the multimedia content and the mapped motion data may configure the above-described action robot content.

The memory 470 may include various storage devices such as a ROM, a RAM, an EEPROM, a flash drive, a hard drive, etc. in hardware.

The processor 480 may control overall operation of the action robot 400. For example, the processor 480 may include at least one CPU, application processor (AP), microcomputer, integrated circuit, application specific integrated circuit (ASIC), etc.

The processor 480 may control the output interface 450 to output multimedia content received from the management device 200a or the terminal 500.

In addition, the processor 480 may control the robot module driver 460 such that the robot module 401 performs predetermined motion or action while the multimedia content is output or regardless of output of the multimedia content.

In addition, when the robot module 401 is mounted on the base 402, the processor 480 may recognize the mounted robot module 401 and transmit the identification information of the robot module 401 to the terminal 500 or the management device 200a. Therefore, the terminal 500 or the management device 200a may provide motion data corresponding to the type of the recognized robot module 401 based on the identification information when the motion data is provided.

Figure 7:
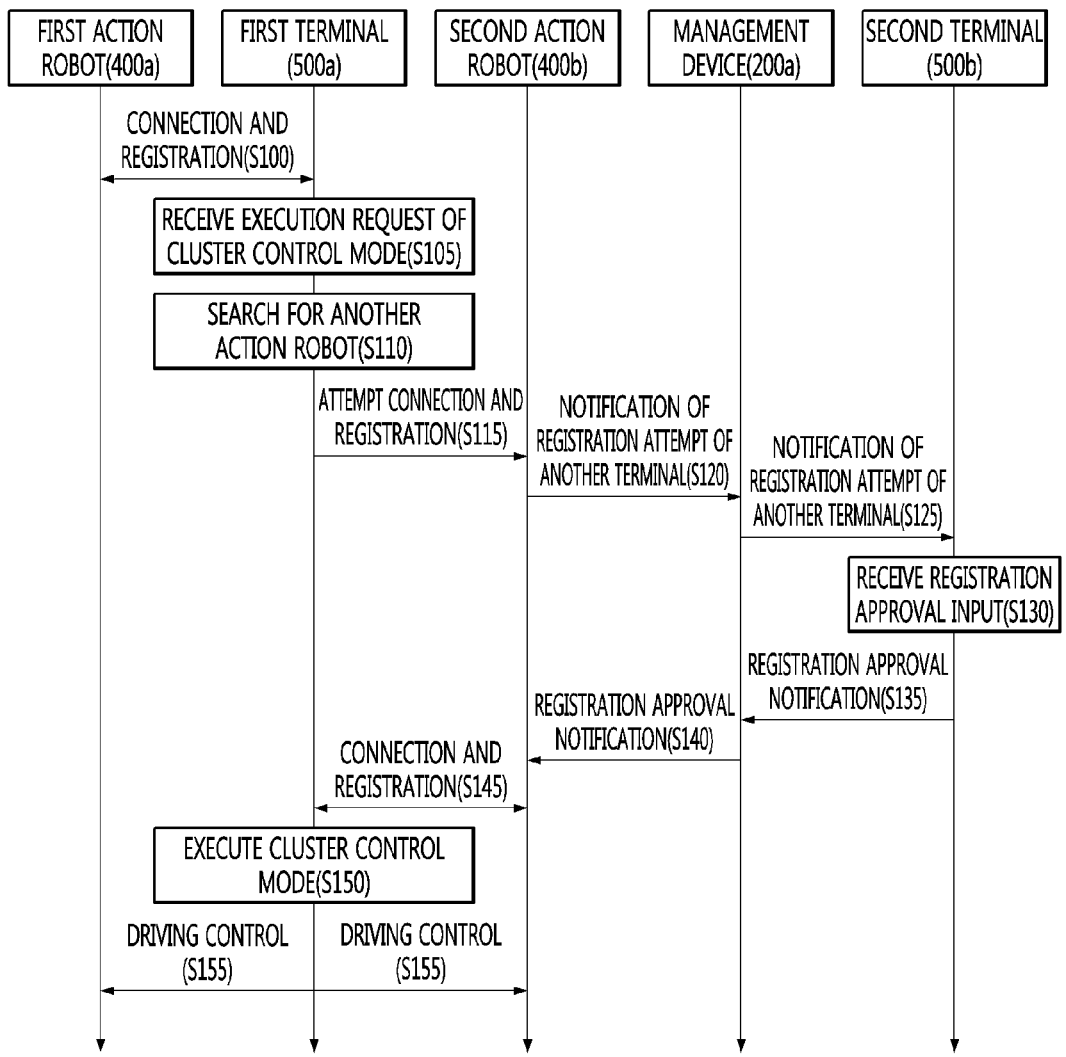
FIG. 7 is a ladder diagram illustrating operation in which a terminal connected to an action robot according to an embodiment of the present disclosure controls driving of a plurality of action robots through a cluster control mode.

FIG. 7 is a ladder diagram illustrating operation in which a terminal connected to an action robot according to an embodiment of the present disclosure controls driving of a plurality of action robots through a cluster control mode.

Hereinafter, assume that the components included in the terminals 500a and 500b are equal to the components included in the AI device 100 of FIG. 1.

Referring to FIG. 7, the first terminal 500a may be connected and registered with the first action robot 400a (S100).

The first user having the first terminal 500a and the first action robot 400a may register the first terminal 500a as a terminal capable of controlling the first action robot 400a. According to the registration, the identification information of the first terminal 500a may be stored in the memory 470 of the first action robot 400a or the management device 200a. The first action robot 400a may be controlled by the first terminal 500a and may not be controlled by another terminal.

In this case, when an application related to control of the action robot is executed in the first terminal 500a, the first terminal 500a may be connected to the first action robot 400a. For example, the first terminal 500a may be directly connected to the first action robot 400a according to a short range wireless communication method (Bluetooth, etc.). Alternatively, the first terminal 500a may be connected to the first action robot 400a through the management device 200a.

The first terminal 500a may receive an execution request of the cluster control mode from the user (S105).

The processor 180 of the first terminal 500a may receive the execution request of the cluster control mode among functions and modes provided by the application through the input interface 120.

The first terminal 500a may search for another action robot located around the first terminal 500a based on the received execution request of the cluster control mode (S110).

For example, the processor 180 of the first terminal 500a may search for another action robot located within a predetermined distance from the first terminal 500a through a pairing process according to a Bluetooth method.

The first terminal 500a may attempt connection and registration with the searched second action robot 400b when the second action robot 400b is searched (S115). The second action robot 400b may transmit registration attempt notification of the first terminal 500a to the management device 200a according to connection and registration attempt of the first terminal 500a instead of the pre-registered second terminal 500b (S120). The management device 200a may transmit the registration attempt notification received from the second action robot 400b to the second terminal 500b pre-registered with respect to the second action robot 400b (S125).

The processor 180 of the first terminal 500a may attempt connection with the second action robot 400b based on the pairing process, when the second action robot 400b is searched. For example, the processor 180 may transmit, to the second action robot 400b, the identification information of the first terminal 500a.

The processor 480 of the second action robot 400b may determine whether the first terminal 500a is registered based on the identification information of the first terminal 500a.

When the identification information of the first terminal 500a is not stored in the memory 470 of the second action robot 400b, the processor 480 may transmit, to the second terminal 500b, registration attempt notification for allowing the user of the pre-registered second terminal 500b to determine whether the first terminal 500a is registered, through the management device 200a.

The second terminal 500b may output an interface (a screen, a popup window, etc.) for allowing the user to determine whether connection and registration of the first terminal 500a with the second action robot 400b is approved, based on the received registration attempt notification.

When registration approval input is received from the user (S130), the second terminal 500b may transmit registration approval notification to the second action robot 400b through the management device 200a (S135 and S140).

The second action robot 400b may perform connection and registration with the first terminal 500a in response to the received registration approval notification (S145).

The processor 480 of the second action robot 400b may store the identification information of the first terminal 500a in the memory 470, thereby registering the first terminal 500a as a controllable terminal. However, the processor 480 may delete the identification information of the first terminal

500a, after a predetermined time or when a registration release command is received from the second terminal 500b.

In some embodiments, the management device 200a may connect the first terminal 500a with the second action robot 400b in response to the registration approval notification. Therefore, the first terminal 500a may control the second action robot 400b through the management device 200a.

The first terminal 500a may execute a cluster control mode as the first action robot 400a and the second action robot 400b are connected (S150), and may control driving of the first action robot 400a and the second action robot 400b through the cluster control mode (S155).

The processor 180 of the first terminal 500a may execute the cluster control mode through an application as the first action robot 400a and the second action robot 400b are connected.

The processor 180 may control driving of the first action robot 400a and the second action robot 400b to output the action robot content, when the action robot content to be output through the first action robot 400a and the second action robot 400b is selected by the user.

That is, according to the embodiment of the present disclosure, the terminal may control driving of the plurality of action robots to provide the action robot content, thereby providing various types of content to the user.

Meanwhile, the terminal 500 may output multimedia content (sound, etc.) only through any one action robot and output motion through a plurality of action robots, when the action robot content is output through the plurality of action robots 400. The embodiment will be described with reference to FIGS. 8 to 14.

In addition, the terminal 500 may detect error of a motion output time point of at least one action robot during motion output of the plurality of action robots and perform correction of the motion output time point. An embodiment related thereto will be described with reference to FIG. 15.

Figure 8:
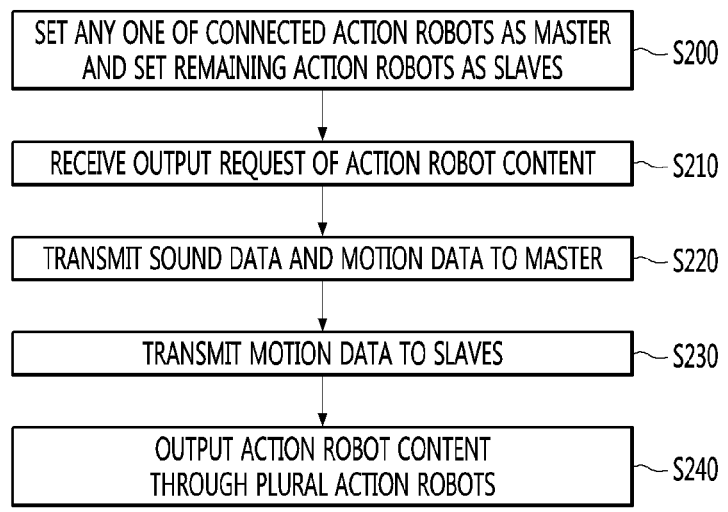
FIG. 8 is a flowchart illustrating an embodiment of operation in which a terminal according to an embodiment of the present disclosure outputs action robot content through a plurality of action robots.
Figure 9:
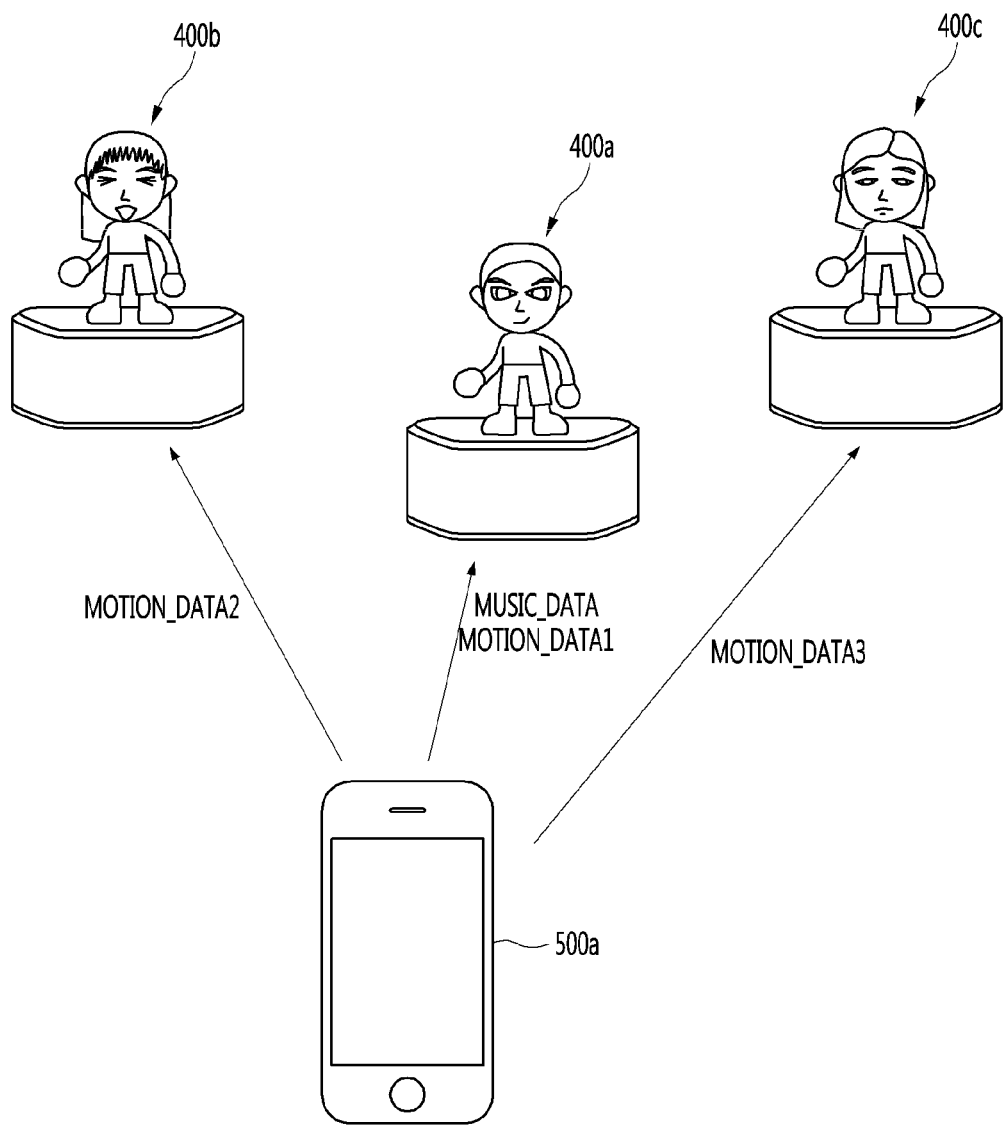
FIGS. 9 to 10 are views showing examples related to the embodiment shown in FIG. 8.
Figure 10:
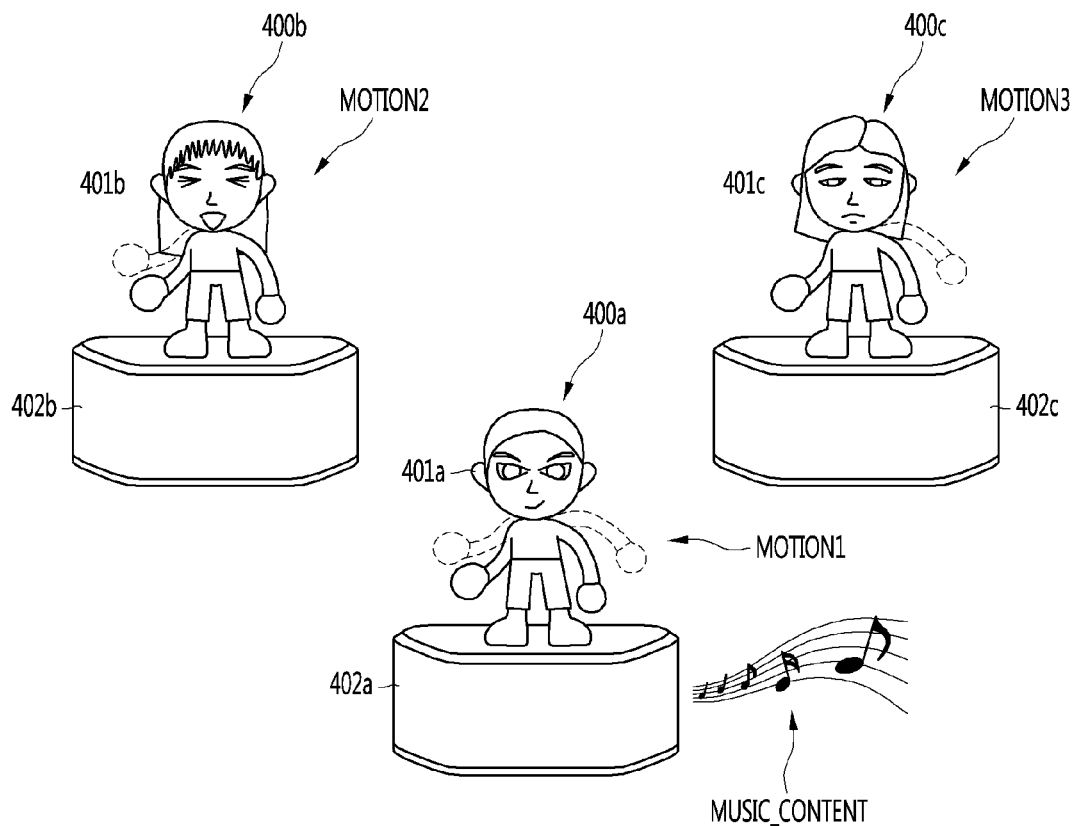

FIG. 8 is a flowchart illustrating an embodiment of operation in which a terminal according to an embodiment of the present disclosure outputs action robot content through a plurality of action robots. FIGS. 9 to 10 are views showing examples related to the embodiment shown in FIG. 8.

Hereinafter, for convenience of description, assume that multimedia content included in action robot content is music content. In this case, the action robot content may include sound data corresponding to the music content and at least one motion data corresponding to at least one motion.

Referring to FIGS. 8 to 10, the terminal 500a may set any one 400a of the plurality of connected action robots 400a to 400c as a master and set the remaining robots 400b and 400c as slaves (S200).

For example, the processor 180 of the terminal 500a may set the first action robot 400a of the plurality of connected action robots 400a to 400c as a master.

The master may be set by selection input of the user.

In some embodiments, the first action robot 400a of the plurality of action robots 400a to 400c may be connected and registered with the terminal 500a in advance, and the remaining action robots 400b and 400c may be robots of the other users and may be connected and registered for the cluster control mode. In this case, the terminal 500a may automatically set the first action robot 400a as a master and automatically set the remaining action robots 400b and 400c as slaves.

Alternatively, the processor 180 may set the first action robot 400a as a master based on the placement positions of the plurality of action robots 400a to 400c. Embodiments related thereto will be described below with reference to FIGS. 11 to 14.

The terminal 500a may receive an output request of the action robot content from the user (S210), and transmit sound data MUSIC_DATA and motion data MOTION_DATA1 included in the action robot content to the master 400a (S220). In addition, the terminal 500a may transmit motion data MOTION_DATA2 and MOTION_DATA3 to the slaves 400b and 400c (S230).

The processor 180 of the terminal 500a may receive the output request of the action robot content from the user through the input interface 120.

Based on the received output request, the processor 180 may receive the sound data and the motion data included in the action robot content from the management device 200a and transmit the received data to the action robots 400a to 400c.

Alternatively, when the sound data and the motion data included in the action robot content are stored in the memory 170 of the terminal 500a, the processor 180 may transmit the data stored in the memory 170 to the action robots 400a to 400c.

Specifically, the action robot content may include data (sound data MUSIC_DATA) corresponding to multimedia content (music content) and at least one motion data MOTION_DATA1, MOTION_DATA2 and MOTION_DATA3 corresponding to at least one motion.

For example, first motion data MOTION_DATA1 of the at least one motion data MOTION_DATA1, MOTION_DATA2 and MOTION_DATA3 may be motion data of the action robot 400a set as the master and the remaining motion data MOTION_DATA2 and MOTION_DATA may be motion data of the action robots 400b and 400c set as the slaves.

The processor 180 may transmit the sound data MUSIC_DATA and the first motion data MOTION_DATA1 to the first action robot 400a set as the master.

The processor 180 may transmit the second motion data MOTION_DATA2 to the second action robot 400b set as the slave, and transmit the third motion data MOTION_DATA3 to the third action robot 400c set as the slave.

The action robots 400a to 400c may be driven based on the data received from the terminal 500a, thereby outputting the action robot content (S240).

The processor 480 of the first action robot 400a may output music content, by controlling the speaker 452 based on the received sound data MUSIC_DATA. In addition, the processor 480 may output first motion through the robot module 401, by controlling the robot module driver 460 based on the received first motion data MOTION_DATA1.

The processor 480 of the second action robot 400b may output second motion through the robot module 401, by controlling the robot module driver 460 based on the received second motion data MOTION_DATA2. The processor 480 of the third action robot 400c may output third motion through the robot module 401, by controlling the robot module driver 460 based on the received third motion data MOTION_DATA3.

That is, the action robots 400a to 400c may provide group motion, by outputting the first motion to the third motion. For example, the first motion to the third motion may be different from one another. In some embodiments, some of the first motion to the third motion may be equal.

Meanwhile, when music content is output through the plurality of action robots 400a to 400c, since output quality of the action robot content may deteriorate due to an out-of-sync state, the terminal 500a outputs the music content only through the action robot 400a set as the master. Therefore, it is possible to prevent the output quality of the action robot content from deteriorating due to the out-of-sync state.

Figure 11:
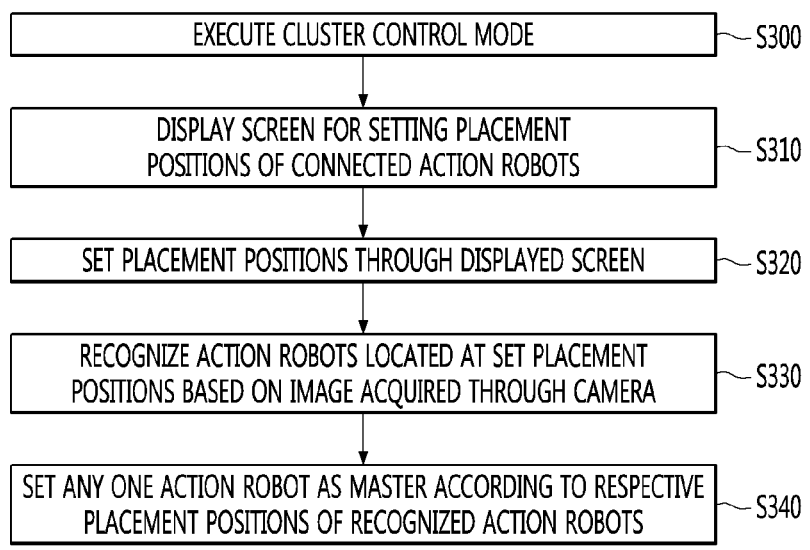
FIG. 11 is a flowchart illustrating an embodiment of operation in which the placement positions of action robots are guided and any one action robot is set as a master by a terminal according to an embodiment of the present disclosure.
Figure 12:
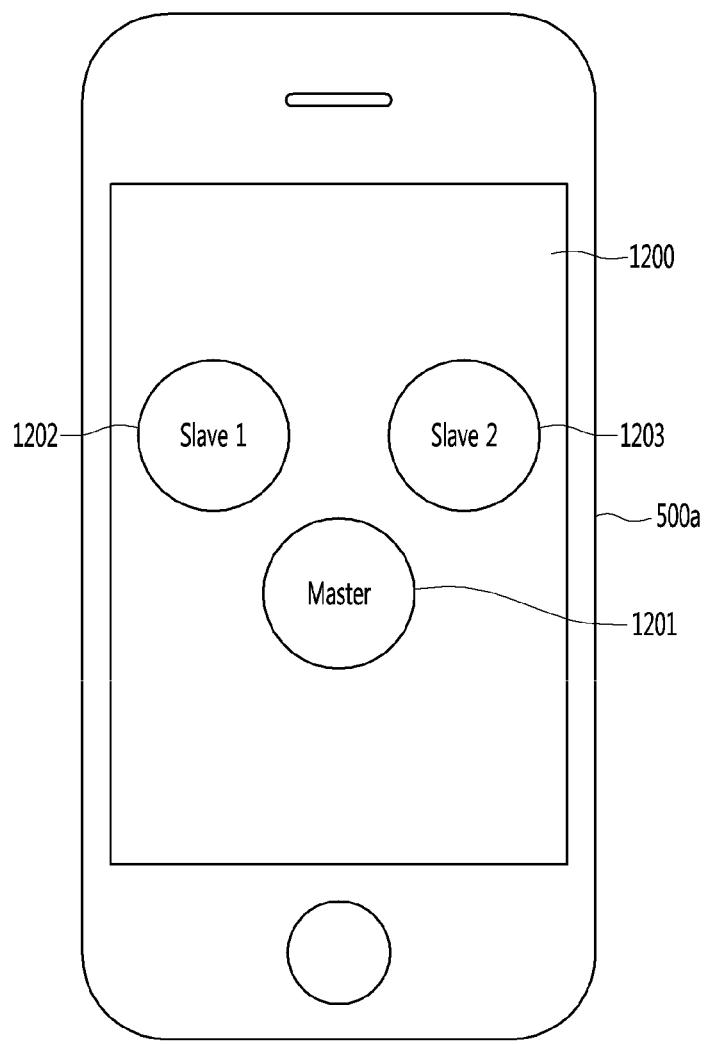
FIGS. 12 to 14 are views showing examples related to the embodiment shown in FIG. 11.
Figure 13:
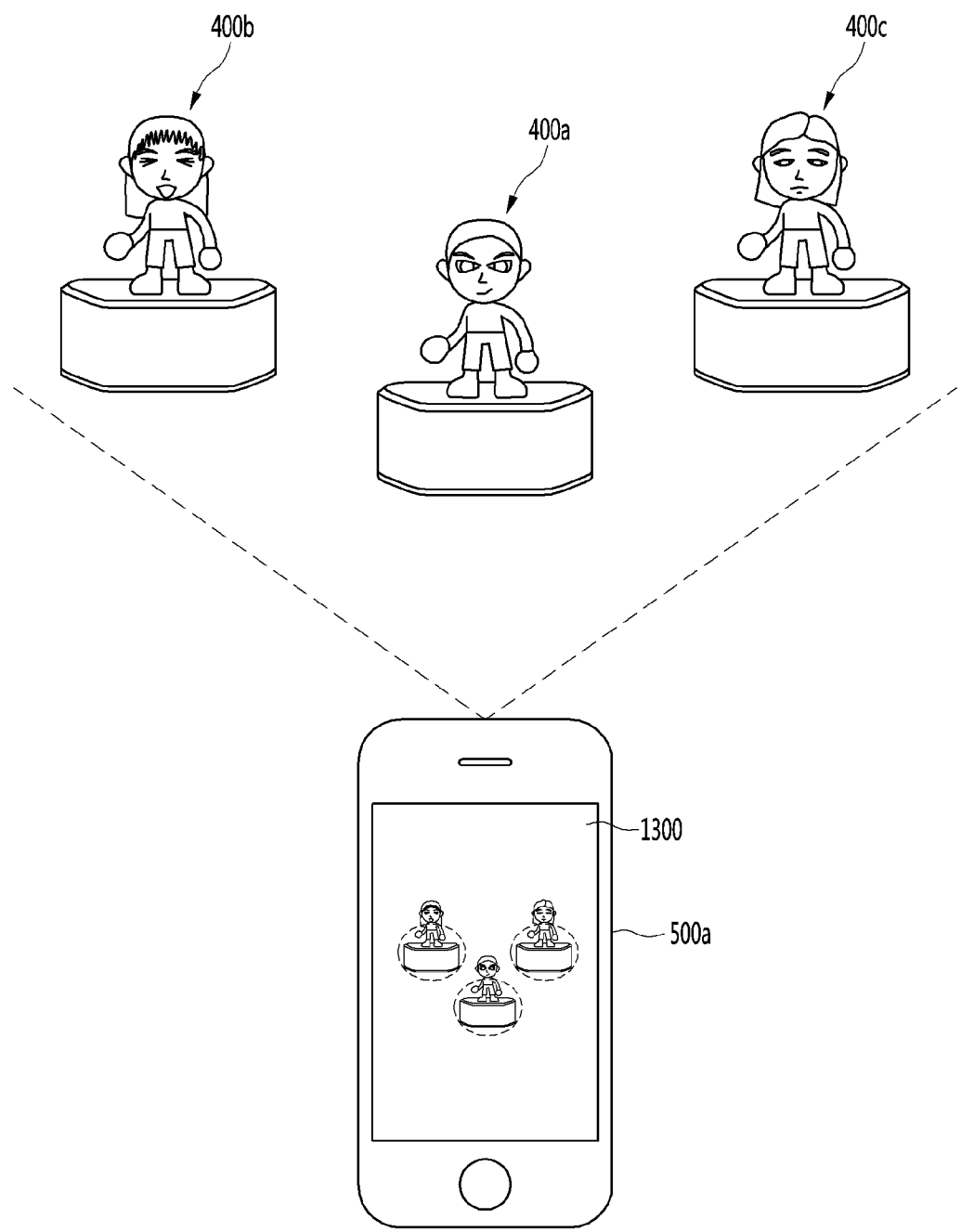
Figure 14:
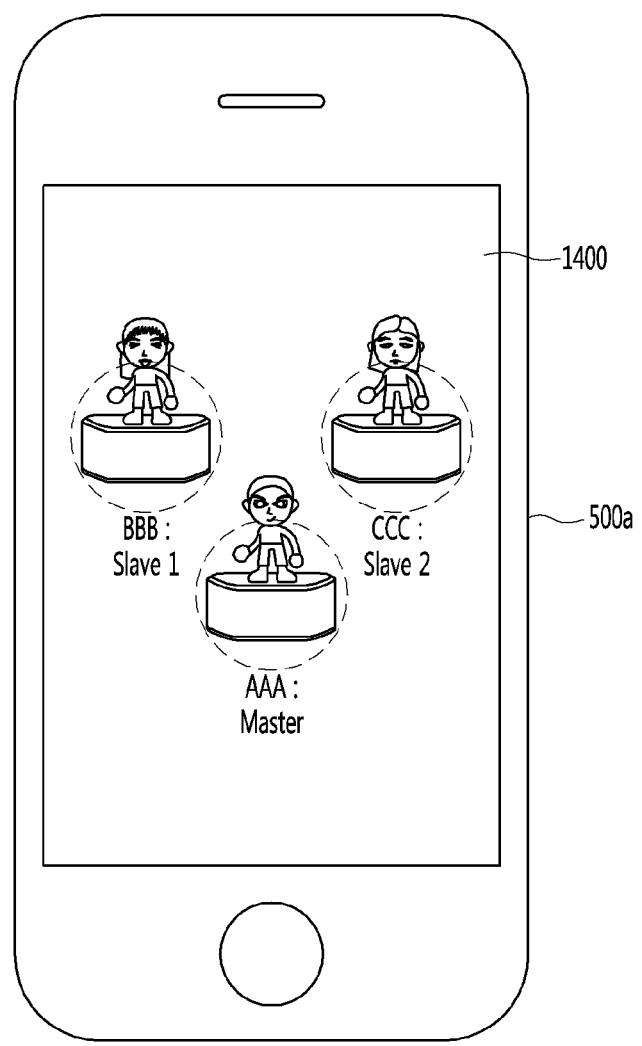

FIG. 11 is a flowchart illustrating an embodiment of operation in which the placement positions of action robots are guided and any one action robot is set as a master by a terminal according to an embodiment of the present disclosure. FIGS. 12 to 14 are views showing examples related to the embodiment shown in FIG. 11.

Referring to FIGS. 11 to 14, when the plurality of action robots 400a to 400c is connected to execute the cluster control mode (S300), the terminal 500a may display a screen for setting the placement positions of the connected action robots 400a to 400c through a display (S310). Through the screen 100 displayed on the terminal 500a, the placement positions of the plurality of action robots 400a to 400c may be set (S320).

The processor 180 may display the screen 1200 for setting the placement position of the action robots through the display, as the cluster control mode is executed.

For example, the screen 1200 may include placement position markers 1201 to 1203 respectively corresponding to the plurality of placement positions. The placement position markers 1201 to 1203 may indicate the placement positions of the plurality of action robots.

The number of placement position markers 1201 to 1203 may correspond to the number of action robots 400 currently connected to the terminal 500a. That is, when the first action robot 400a to the third action robot 400c are connected to the terminal 500a, the processor 180 may display three placement position markers 1201 to 1203 on the screen 1200.

Meanwhile, the position of each of the placement position markers 1201 to 1203 may be changed according to input received through the input interface 120. For example, the user may change the positions of the placement position markers 1201 to 1203 through touch and drag input of each of the placement position markers 1201 to 1203 displayed on the display.

Meanwhile, the first placement position marker 1201 of the placement position markers 1201 to 1203 may correspond to the master and the second placement position marker 1202 and the third placement position marker 1203 may correspond to the slaves.

The terminal 500a may recognize the action robots 400a to 400c located at the set placement positions based on an image acquired through a camera (S330). The terminal 500a may set any one action robot 400a as a master based on the respective placement positions of the recognized action robots 400a to 400c (S340).

Referring to FIGS. 13 and 14, the processor 180 of the terminal 500a may acquire an image through the camera and display a screen 1300 including the acquired image through the display.

In addition, the processor 180 may overlap and display guide items corresponding to the respective positions of the placement position markers 1201 to 1203 shown in FIG. 12 on the screen 1300. The user may adjust the placement positions of the action robots 400a to 400c based on the displayed screen 1300 and the guide items.

The processor 180 may recognize the located action robots 400a to 400c when the action robots 400a to 400c are located to correspond to the guide items.

For example, the processor 180 may recognize the respective placement positions of the action robots 400a to 400c based on the respective shapes of the action robots 400a to 400c in the image acquired through the camera and the respective identification information of the connected action robots 400a to 400c.

In some embodiments, when the shapes of some of the connected action robots 400a to 400c are identical, the processor 180 may recognize the respective placement positions of the action robots 400a to 400c through the query output of the identification information corresponding to the action robot located at a predetermined placement position and selection input of the user.

Referring to FIG. 14, the processor 180 may automatically set any one action robot 400a as a master based on the result of recognizing the action robots 400a to 400c located at the respective placement positions.

For example, as shown in FIG. 12, a first placement position marker 1201 corresponds to a master, and the processor 180 may recognize that the first action robot 400a is placed at a position corresponding to the first placement position marker 1201. In this case, the processor 180 may set the first action robot 400a as a master and set the second action robot 400b and the third action robot 400c as slaves.

The processor 180 may transmit data of multimedia content and motion data to the first action robot 400a set as the master, and transmit motion data to the second action robot 400b and the third action robot 400c set as the slaves. The action robots 400a to 400c may provide the action robot content to the user based on the received data.

Figure 15:
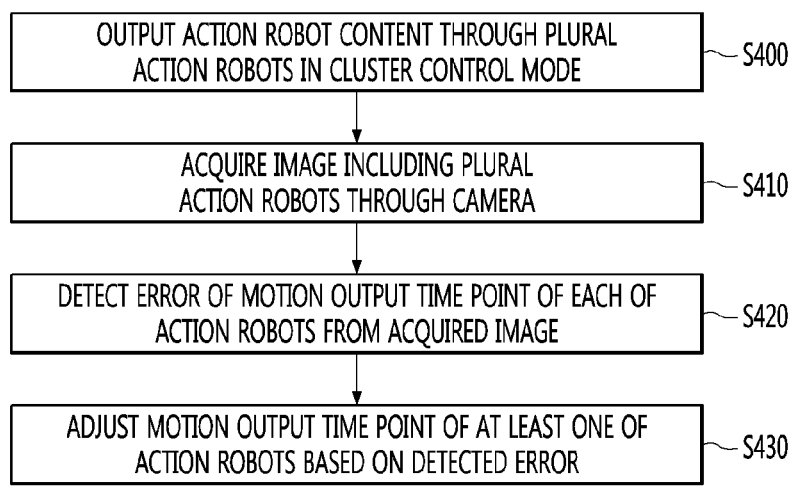
FIG. 15 is a flowchart illustrating operation in which a terminal according to an embodiment of the present disclosure corrects motion output time points of a plurality of action robots for outputting action robot content.

FIG. 15 is a flowchart illustrating operation in which a terminal according to an embodiment of the present disclosure corrects motion output time points of a plurality of action robots for outputting action robot content.

Referring to FIG. 15, the terminal 500 may output the action robot content through the plurality of action robots 400 according to execution of the cluster control mode (S400).

Step S400 has been described above with reference to FIGS. 7 to 14 and thus a description thereof will be omitted.

The terminal 500 may acquire an image including a plurality of action robots 400 through the camera while action robot content is output (S410). The terminal 500 may detect error of the motion output time point of each of the action robots 400 from the acquired image (S420).

The processor 180 may acquire the image including the action robots through the camera while the action robot content is output.

The processor 180 may recognize motion output by each of the action robots 400 at a predetermined time point of the acquired image. In addition, the processor 180 may check motion corresponding to the predetermined time point from the motion data of each of the action robots 400.

The processor 180 may detect error of the motion output time point of each of the action robots 400 based on the motion recognition result of each of the action robots 400 at the predetermined time point and motion checked from the motion data.

For example, at the predetermined time point, the first action robot 400a should perform motion "A" and the second action robot 400b and the third action robot 400c should perform motion "B", based on the motion data. However, at the predetermined time point, the second action robot 400b and the third action robot 400c may be recognized as performing motion "B" but the first action robot 400a may be recognized as performing motion "A1" which should be performed 0.1 seconds after motion "A". In this case, the processor 180 may detect that the error of the motion output time point of the first action robot 400a is +0.1 seconds.

The terminal 500 may adjust the motion output time point of at least one of the action robots 400 based on the detected error (S430).

The processor 180 may transmit a control signal for adjusting the motion output time point to the action robot in which the error has been detected. The action robot, which has received the control signal, may adjust the motion output time point, thereby removing the error.

According to the example described above in step S420, the processor 180 may transmit a control signal for delaying the motion output time pint by 0.1 seconds to the first action robot 400a. The processor 480 of the first action robot 400a may adjust the control time point of the robot module driver 460 in response to the received control signal, thereby removing the error.

As the error is removed, it is possible to guarantee the quality of the action robot content provided through the action robots 400.

According to the embodiment of the present disclosure, a terminal can control driving of a plurality of action robots to provide action robot content, thereby providing more various types of content to a user.

In addition, the terminal can output multimedia content such as sound data through any one of a plurality of action robots, thereby preventing output quality deterioration of action robot content due to an out-of-sync state.

In addition, the terminal can detect and remove error of a motion output time point of each of the plurality of action robots, thereby preventing output quality deterioration of the action robot content and increasing user's satisfaction.

The foregoing description is merely illustrative of the technical idea of the present disclosure, and various changes and modifications may be made by those skilled in the art without departing from the essential characteristics of the present disclosure.

Therefore, the embodiments disclosed in the present disclosure are to be construed as illustrative and not restrictive, and the scope of the technical idea of the present disclosure is not limited by these embodiments.

The scope of the present disclosure should be construed according to the following claims, and all technical ideas within equivalency range of the appended claims should be construed as being included in the scope of the present disclosure.

What is claimed is:

1. A terminal comprising:
a communication transceiver configured to establish connection with a first action robot;
an input interface configured to receive an execution request of a cluster control mode of an application; and
a processor configured to:
search for at least one other action robot other than the first action robot through the communication transceiver in response to the received execution request,
control the communication transceiver to attempt connection with the searched at least one other action robot, and
control output of action robot content through the first action robot and the at least one other action robot according to execution of the cluster control mode, when connection with the at least one other action robot is established.

2. The terminal of claim 1, wherein the processor:
receives an output request of the action robot content through the input interface, and
transmits content data of multimedia content included in the action robot content and motion data included in the action robot content to the first action robot and the at least one other action robot, in response to the received output request.

3. The terminal of claim 2,
wherein the action robot content includes a plurality of motion data, and
wherein the processor transmits first motion data to some of the action robots and transmits second motion data different from the first motion data to the other action robots.

4. The terminal of claim 2, wherein the processor:
sets any one of the action robots as a master and sets the remaining at least one action robot as a slave, and
transmits the content data to the action robot set as the master.

5. The terminal of claim 4, wherein, when the first action robot is connected and registered with the terminal in advance and the at least one other action robot is connected and registered with another terminal in advance,
the processor sets the first action robot among the action robots as the master.

6. The terminal of claim 2, wherein the processor receives the content data and the motion data from a management device connected through the communication transceiver in response to the output request.

7. The terminal of claim 2, further comprising a memory configured to store the content data and the motion data included in the action robot content,
wherein the processor transmits the content data and the motion data stored in the memory to the first action robot and the at least one other action robot.

8. The terminal of claim 2, wherein the processor:
acquires an image including the action robots using a camera while the action robot content is output,
detects error of a motion output time point of at least one of the action robots based on the acquired image, and
adjusts the motion output time point of the at least one action robot based on the detected error.

9. The terminal of claim 1,
wherein the processor displays a screen for setting placement positions of the plurality of connected action robots through a display,
wherein the screen includes a plurality of placement position markers corresponding to a plurality of placement positions, and
wherein a first placement position of the plurality of placement positions corresponds to the master.

10. The terminal of claim 9,
wherein the number of placement position markers corresponds to the number of action robots connected to the terminal, and
wherein a display position of each of the plurality of placement position markers is changed based on input received through the input interface.

11. The terminal of claim 9, wherein the processor:
displays a screen corresponding to an image acquired through a camera on the display,
overlaps and displays a plurality of guide items corresponding to the plurality of placement position markers on the screen, and
recognizes the plurality of action robots located at positions respectively corresponding to the plurality of guide items.

12. The terminal of claim 11, wherein the processor sets, as the master, an action robot located at a position of a guide item corresponding to the first placement position marker among the plurality of action robots.

13. A method of operating a terminal, the method comprising:
- establishing connection with a first action robot;
- receiving an execution request of a cluster control mode;
- searching for at least one other action robot other than the first action robot in response to the received execution request;
- attempting connection with the searched at least one other action robot; and
- controlling output of action robot content through the first action robot and the at least one other action robot, when connection with the at least one other action robot is established,
- wherein the action robot content includes content data of multimedia content and motion data.

14. The method of claim 13, wherein the controlling includes:
- setting any one of the action robots as a master and sets the remaining action robot as a slave;
- transmitting the content data and the motion data to the action robot set as the master; and
- transmitting the motion data to at least one action robot set as the slave.

15. The method of claim 14, wherein the setting of any one action robot among the action robots as the master and the setting of the remaining action robot as the slave includes:
- acquiring an image including the action robots through a camera; and
- setting the any one action robot as the master based on placement positions of the action robots included in the acquired image.

16. The method of claim 13, further comprising:
- acquiring an image including the action robots using a camera while the action robot content is output;
- detecting error of a motion output time point of at least one of the action robots based on the acquired image, and
- adjusting the motion output time point of the at least one action robot based on the detected error.

* * * * *